March 22, 1960     J. L. ALTEKRUSE     2,930,035
TERRAIN CLEARANCE CONTROL APPARATUS
Filed July 12, 1954     2 Sheets-Sheet 1
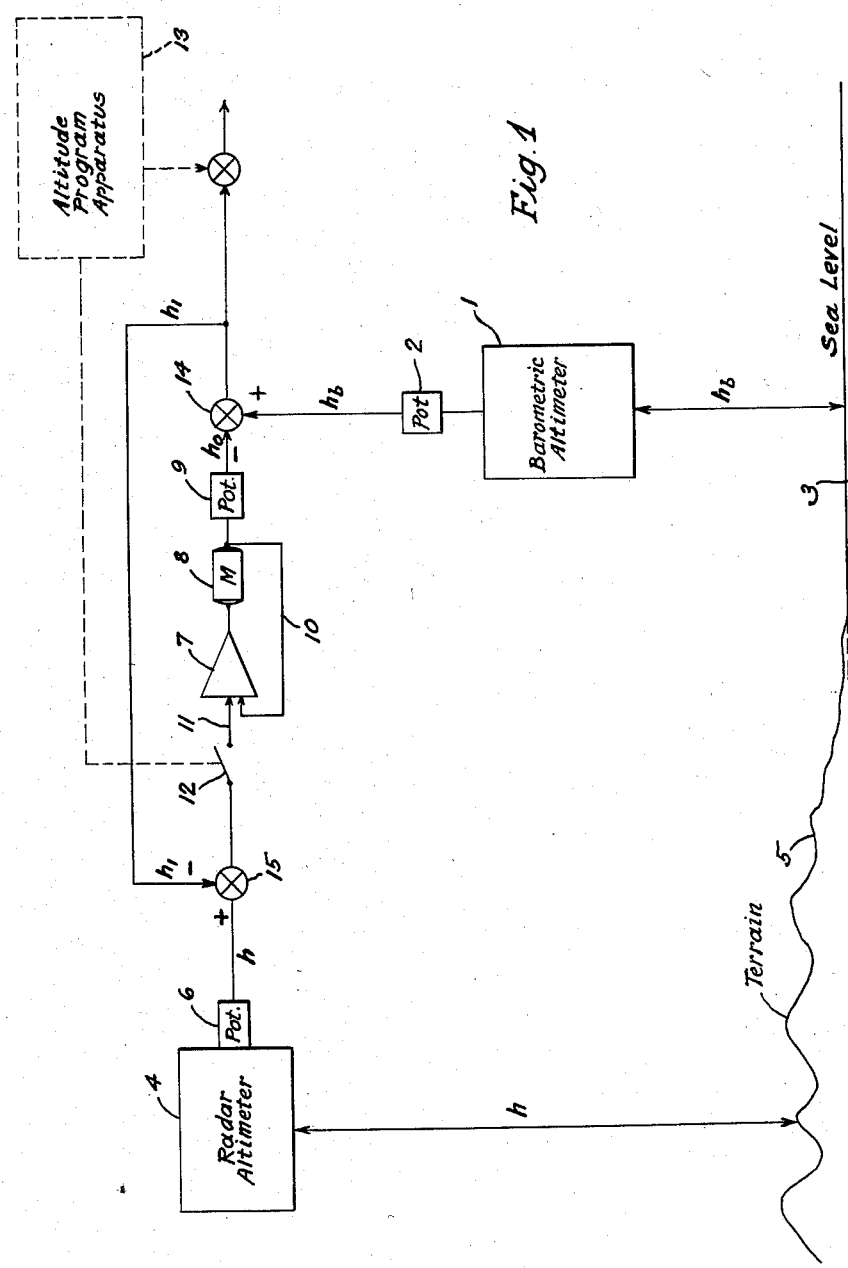
INVENTOR.
John L. Altekruse
BY
ATTORNEY

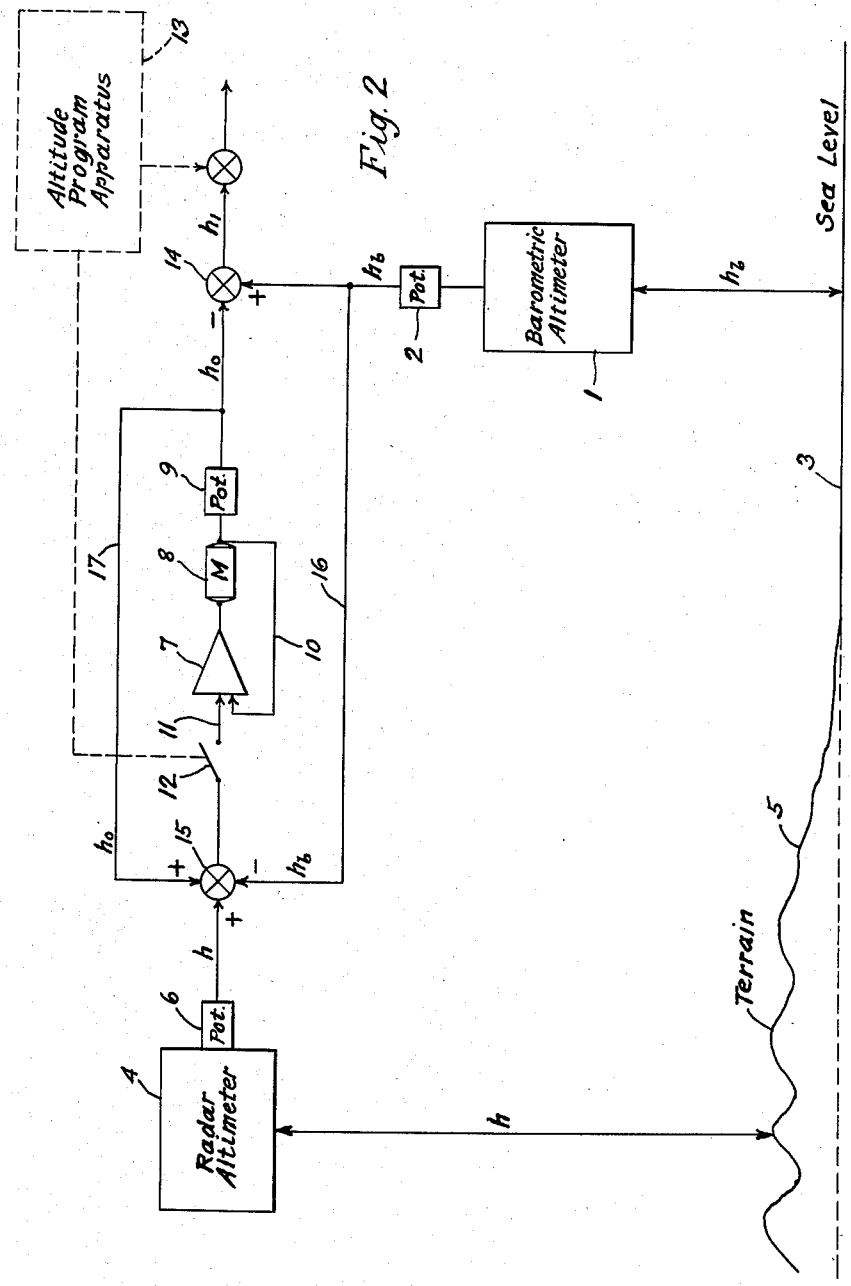

United States Patent Office 2,930,035
Patented Mar. 22, 1960

2,930,035
TERRAIN CLEARANCE CONTROL APPARATUS

John L. Altekruse, Cuyahoga Falls, Ohio, assignor to Goodyear Aircraft Corporation, Akron, Ohio, a corporation of Delaware Application July 12, 1954, Serial No. 442,499

7 Claims. (Cl. 343—7)

This invention relates to air navigation and is particularly directed to the determination of terrain clearance. The invention is especially useful in the accurate determination of clearance over terrain and the development therefrom of a voltage which is an analog thereof and which may be employed in guiding a missile or other carrier according to a desired program although such voltage may also be employed to operate indicating or recording instruments for imparting information to pilots of aircraft.

Heretofore it has been the general practice to employ a barometric altimeter for determining elevation above sea level but as is well known the reading of such an instrument must be correct for atmospheric conditions and cannot be depended upon without such correction. Also such barometric altimeter can only be used to determine elevation above standard sea level and does not indicate altitude above terrain.

It has also been found possible to accurately determine altitude above terrain by use of a radar altimeter which sends signals from a point of elevation vertically against the terrain and determines the elevation by the time necessary for the reflected signal to return. The radar altimeter is quite accurate and its determinations are unaffected by atmospheric conditions. However, where the instrument is being transported above terrain at a high velocity and the terrain has abrupt and random spaced undulations, for example, presence of hills and valleys, the output of the instrument fluctuates accordingly and includes noise interferences, and if used continuously to feed terrain information to control mechanism of a guided missile or the like it would cause too rapid fluctuation of the control mechanism and deviations in the course of the missile.

It is an object of the present invention to provide improved altimeter performance.

A further object is to provide terrain clearance apparatus free from minor fluctuations and suitable for controlling a pitch auto pilot or other missile controlling instrument.

These and other objects will appear from the following description, reference being had to the accompanying drawings.

In the drawings, Fig. 1 is a block diagram of one configuration of the apparatus.

Fig. 2 is a similar diagram showing a modification thereof.

Referring to the diagram, the numeral 1 designates a barometric altimeter of ordinary construction having an evacuated capsule, exposed to the atmosphere and collapsible and expandable under the influence of differences in pressure, and a multiplying gear train for multiplying its movements under changes of atmospheric pressure. The gear train may be connected to a direct indicating dial or recording device but is also utilized to drive a potentiometer 2, directly connected thereto and suitably supplied by a current source in known manner to provide an output voltage $h_b$ which is a function of elevation above standard sea level 3. As will be understood, the output voltage, like the indication of the barometric altimeter, is subject to an error due to atmospheric changes in pressure.

The numeral 4 designates a radar altimeter which is of known construction and which senses pulses of high frequency signals reflected from the terrain 5. The radar altimeter drives a potentiometer 6 which is suitably supplied by a current source in known manner to provide an output voltage $h$. This radar altimeter is free from influence of atmospheric changes and its output $h$ is an accurate function of altitude above the terrain. However where the terrain is composed of undulations such as ridges and valleys, closely populated districts having buildings and the like, corresponding fluctuations occur in the output $h$ of the radar altimeter especially when the altimeter is carried by aircraft or a flying missile at a high speed of translation across such terrain. Also the output of the radar altimeter is a function of the altitude above terrain rather than altitude above sea level.

It is an object of the present invention to provide a voltage output free from errors due to atmospheric conditions and also free from minor fluctuations due to undulating terrain and which is a true function of altitude above a known section of terrain.

It is a further object of the invention to provide for utilizing such output voltage for combining with the output of an altitude program apparatus to provide a voltage for controlling an auto pilot.

To provide a voltage $h_o$ which is a correction factor to the barometric altimeter, an integrator comprising an amplifier 7 the output of which drives a motor 8, which in turn operates a potentiometer 9, is provided, the amplifier being provided with the usual feed back 10 for stabilizing its operation. The input line 11 to the amplifier is provided with a switch 12 and the input voltage is intermittently fed to the line 11 by opening and closing of the switch which may be operated at intervals from an altitude programming apparatus 13 or other source of current. Such current in the case of a missile or other body travelling at high speed may be supplied at fifty mile or five minute intervals.

The information $h_o$ supplied during these intervals is stored or memorized and combined at summing point 14 with the information $h_b$ received from the barometric altimeter and the resulting combined voltage $h_1$ is fed back to summing point 15 where it is combined with the output $h$ from the radar altimeter to provide the input voltage to switch 12 and through it to the amplifier.

It will be seen that the barometric altimeter is used as the primary control for the missile or other moving body to provide smooth, fast response signals and that the barometric altimeter is corrected at prescribed check points by a closed loop comparison with the radar altimeter output. This correction may be accomplished by a programmed momentary closing of switch 12 which causes the integrator to make $h_1 = h$. It can be shown that $h_b - h_o = h_1$, or $h_o = h_b - h_1$, and therefore; since $h_1 = h$, that $h_o = h_b - h$. The correction factor $h_o$ at each check point is thus equal to the compensation required to correct the barometric output for the local ambient temperature and pressure as well as the terrain elevation. The correction factor $h_o$ is stored by the integrator and is used as the reference for the subsequent period until the next check point. Between check points, changes in altitude can be accomplished by programming against the barometric altimeter.

Thus the barometric altimeter provides noise-free high-speed altitude signals which are automatically corrected for local conditions at any desired check points.

It can also be seen that if desirable, this correction for local conditions may occur continuously by maintaining switch 12 in the closed position. In this case, the output $h$ of the radar altimeter 4 is continuously compared with $h_1$ and a smoothed or averaged value of $h_0$ is obtained. Switch 12 may then be opened in case of failure of the radar altimeter 4, and the barometric altimeter maintains operation with the correction $h_0$ in effect at the time of failure.

An alternate arrangement of the apparatus is shown in Fig. 2 where the barometric altimeter 1, potentiometer 2, radar altimeter 4, potentiometer 6, amplifier 7, motor 8, potentiometer 9, feed back 10, line 11, and switch 12 are similar to like parts in the embodiment of Fig. 1. However, the line 16 is provided connecting the output $h_b$ of the potentiometer 2 to summing point 15 and line 17 connects to point 15 from between point 14 and potentiometer 9 so as to provide a positive voltage $h_0$ at point 15.

With this arrangement it will be observed that $h+h_0=h_b$ and $h_0=h_b-h$ and $h_1=h_b-h_0=h$.

Where the apparatus is used in conjunction with altitude program apparatus, the pitch control system then acts to nullify the error between the altitude above terrain obtained from the barometric altimeter as corrected by the above described apparatus and the terrain clearance programmed, by changing the pitch attitude of the missile or other moving body carrying the instruments. This brings the missile or other moving body to the desired terrain clearance.

Thus it will be seen that the objects of the invention have been accomplished.

While a certain representative embodiment and details have been shown for the purpose of illustrating the invention, it will be apparent to those skilled in the art that various changes and modifications may be made without departing from the spirit or scope of the invention.

I claim:

1. Terrain clearance indicating or control apparatus comprising a barometric altimeter adapted to determine elevation above sea level but subject to atmospheric errors and correction means therefor comprising a radar altimeter adapted to determine elevation above terrain and free from atmospheric errors, closed loop comparison means coupled to the output of said barometric altimeter, and means for coupling said radar altimeter to said comparison means for supplying a correction factor to the output of said barometric altimeter to provide an error corrected indication of elevation above terrain at all elevations.

2. Terrain clearance control apparatus comprising a barometric altimeter and correction means therefor comprising a radar altimeter, closed loop comparison means coupled to the output of said barometric altimeter, means for coupling said radar altimeter to said comparison means for supplying a correction factor to the output of said barometric altimeter means, altitude programming means for controlling an auto pilot, and means for coupling the corrected barometric altimeter output to said altimeter programming means.

3. Terrain clearance control apparatus comprising a barometric altimeter providing a primary control the output of which contains errors due to ambient atmospheric conditions, a radar altimeter providing a secondary control free from errors due to ambient atmospheric conditions but subject to rapid fluctuations due to undulations of terrain, means for integrating and storing information from said radar altimeter for supplying a correction factor to the output of said barometric altimeter, and means for intermittently or continuously connecting the output of said radar altimeter to said integrating means for adjusting the correction factor.

4. Terrain clearance control apparatus comprising a barometric altimeter providing a primary control the output of which contains errors due to ambient atmospheric conditions, a radar altimeter providing a secondary control free from errors due to ambient atmospheric conditions but subject to rapid fluctuations due to undulations of terrain, means for integrating and storing information from said radar altimeter for supplying a correction factor to the output of said barometric altimeter, means for connecting the output of said radar altimeter to said integrating means for adjusting the correction factor, an altitude programming apparatus, and means for supplying the corrected output of the barometric altimeter to the output of the altitude programming apparatus to provide altitude information to pitch control mechanism.

5. Terrain clearance control apparatus comprising a barometric altimeter and a potentiometer operated thereby providing a primary control the output voltage of which contains errors due to ambient atmospheric conditions, a radar altimeter and a potentiometer operated thereby providing a secondary control free from errors due to ambient atmospheric conditions but subject to rapid fluctuations due to undulations of terrain, means for integrating and storing information from said radar altimeter for supplying a correction factor to the output of the barometric altimeter controlled potentiometer output, and means for connecting the output of said radar altimeter to said integrating means for adjusting the correction factor.

6. Terrain clearance control apparatus comprising a barometric altimeter and a potentiometer operated thereby providing a primary control the output voltage of which contains errors due to ambient atmospheric conditions, a radar altimeter and a potentiometer operated thereby providing a secondary control free from errors due to ambient atmospheric conditions but subject to rapid fluctuations due to undulations of terrain, means for integrating and storing information from said radar altimeter controlled potentiometer for supplying a correction factor to the output of the barometric altimeter controlled potentiometer output, switch means for intermittently connecting the output of said radar altimeter controlled potentiometer to said integrating means for adjusting the correction factor at regular intervals, an altitude programming apparatus, and means for supplying the corrected output of the barometric altimeter to the output of the altitude programming apparatus to provide altitude information to pitch control mechanism.

7. Apparatus for supplying altitude information independent of errors due to slight disturbances in terrain contour, said apparatus comprising a barometric altimeter, a potentiometer driven thereby for providing a voltage representative of altitude above sea level including errors due to atmospheric conditions, a radar altimeter and a potentiometer driven thereby providing a voltage representative of distance above terrain and free from errors due to atmospheric conditions but varying with terrain irregularities, memory information storage and amplifying means for storing information received by said radar altimeter and applying it as a corrective voltage to the output of said barometric altimeter, and switching means periodically connecting said radar altimeter to said information storage means to change the corrective voltage at regular intervals.

References Cited in the file of this patent

UNITED STATES PATENTS

| | | |
|---|---|---|
| 2,417,032 | Wolff | Mar. 4, 1947 |
| 2,562,186 | Hallman | July 31, 1951 |